Nov. 20, 1945.   C. F. FRAGOLA ET AL   2,389,146
FLUX VALVE
Filed Jan. 19, 1943   3 Sheets-Sheet 1

INVENTORS:
C. F. FRAGOLA
M. C. DEPP
R. S. CURRY, JR.
BY
ATTORNEY

Nov. 20, 1945.  C. F. FRAGOLA ET AL  2,389,146
FLUX VALVE
Filed Jan. 19, 1943  3 Sheets-Sheet 2

INVENTORS:
C. F. FRAGOLA
M. C. DEPP
BY R. S. CURRY, JR.
Herbert H. Thompson
their ATTORNEY Nov. 20, 1945.  C. F. FRAGOLA ET AL  2,389,146
FLUX VALVE
Filed Jan. 19, 1943  3 Sheets-Sheet 3

INVENTORS:
C. F. FRAGOLA
M. C. DEPP
R. S. CURRY, JR.
BY Herbert R. Thompson
their ATTORNEY Patented Nov. 20, 1945

2,389,146

UNITED STATES PATENT OFFICE 2,389,146

FLUX VALVE

Caesar F. Fragola, Brooklyn, Marlin C. Depp, Hempstead, and Robert S. Curry, Jr., Baldwin, N. Y., assignors to Sperry Gyroscope Company, Inc., Brooklyn, N. Y., a corporation of New York Application January 19, 1943, Serial No. 472,913

13 Claims. (Cl. 177—351)

The present invention is concerned with improved magnetic-field-responsive devices, especially of the saturable core type disclosed in Antranikian Patent No. 2,047,609, issued July 14, 1936, which we term "flux valves."

In a copending application Serial No. 414,422, for Flux valve compass system, filed October 10, 1941, in the names of O. E. Esval et al., now U. S. Patent No. 2,383,461, there are disclosed various forms which such a field responsive device may assume. For highly efficient operations of such devices as magnetic field responsive devices, it is desirable that the symmetry of their magnetic circuits be maintained throughout 360 degrees of rotation thereof in a magnetic field whereby to maintain a constant reluctance of said circuits to said field and thereby prevent undesired variations in degree of response with azimuthal rotation thereof relative to the direction of said field. The devices shown in said U. S. Patent No. 2,383,-461 are therefore made symmetrical so far as is possible. However, the use of highly permeable magnetic material and the necessity for including air gaps in at least a portion of the magnetic circuit of these former devices, renders the attainment of complete magnetic symmetry difficult. According to the present invention, a new form of flux valve is provided which is simple to manufacture and the magnetic circuit of which is substantially perfectly symmetrical for all positions thereof in a magnetic field.

Accordingly, it is an object of the present invention to provide improved flux valves which are more easily rendered symmetrical to improve the directional characteristics thereof, as by presenting constant reluctance to an external magnetic field for all orientations.

It is a further object of the present invention to provide an improved flux valve in the form of a closed toroid, eliminating the necessity for radially extending arms as in previous forms of the device, and substantially eliminating magnetic leakage flux, whereby the device has little magnetic effect on neighboring magnetic apparatus. However, if any leakage does occur it would not affect similar units which might be placed coaxial with it even though they may be in close proximity with each other. The basis for this is the complete symmetry of the magnetic field about the toroid axis.

It is still another object of the present invention to provide an improved flux valve, the core of which may be easily made in a form adapted symmetrically to support a plurality of output coils which may be connected with a multi-polar signal transformer.

It is a still further object of the present invention to provide an improved form of symmetrical flux valve which approximates a toroidal shape by being formed as a regular polygon having a large number of sides.

It is yet another object of the present invention to provide an improved form of flux valve having a closed magnetic circuit for its exciting flux, whereby only a low excitation power is required.

Further objects and advantages of the present invention will become apparent from the following specification and appended drawings, wherein, Fig. 1 is a schematic representation of one form of flux valve according to the present invention.

Figure 1:
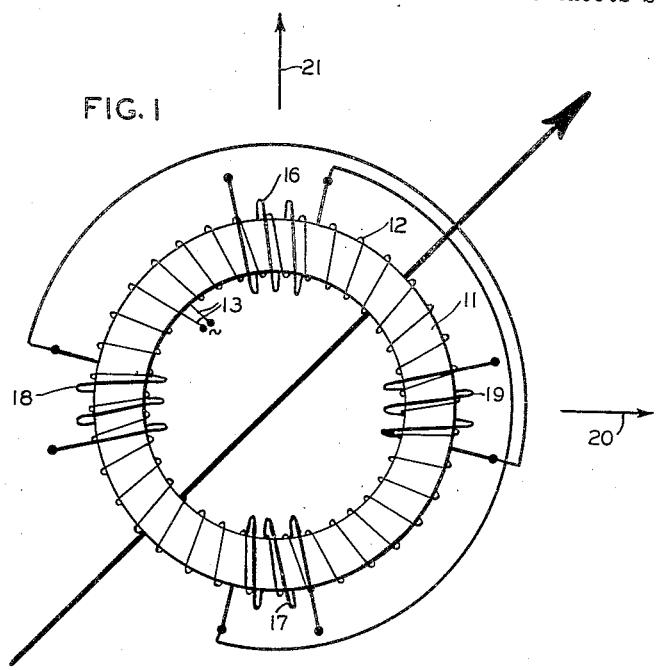

As is seen in Fig. 1, the flux valve of the present invention comprises a toroidal core 11 on which, in the embodiment illustrated, is wound a continuous exciting winding 12, energized from a suitable source of alternating or periodically varying current by means of leads 13. The exciting winding may comprise a plurality of coils suitably disposed about the ring or a uniformly wound, continuous coil as shown. In this way, a circulating periodically varying flux is produced in core 11, creating a varying permeance in the permeable magnetic core 11.

Also wound upon core 11 are a plurality of secondary or pick-up coils arranged in diametrically opposed pairs such as coils 16, 17 and coils 18, 19 shown as disposed in pairs at right angles to one another. Considering coils 16 and 17 for the moment, it will be clear that if these coils are of similar type and have the same number of turns, the voltages therein induced by means of the periodically-varying exciting flux generated by coil 12 will be equal in magnitude, in the absence of any other flux excitation of core 11. By connecting diametrically opposite coils such as coils 16 and 17 in series opposition, the resultant voltage obtained from the pair of coils will be zero in the absence of an externally applied magnetic field.

If such a magnetic field is applied, for example, in the direction of arrow 20, the voltages induced in coils 16 and 17 will be differentially varied in accordance with the theory of operation of such flux valves, as described in the above-mentioned patents. Therefore, a resultant output will be obtained from series-connected coils 16 and 17, which will be of a frequency twice the periodicity of the exciting flux and will have a phase sense which corresponds to the sense of the component of the applied field along the direction represented by arrow 20. If the applied field were along direction 21, it would have no effect upon the coils 16 and 17. Actually, the magnitude of the voltage produced by series-connected coils 16 and 17 will vary sinusoidally with the angle between the direction of the magnetic field and the orientation 21 of the coil-pair 16 and 17.

A similar pair of coils 18 and 19 may be provided at right angles to the first pair 16 and 17, and accordingly will produce, in a similar manner, a double frequency output voltage whose magnitude varies as a cosinusoidal function of the angle between the direction of the magnetic field and the direction of the axes of coil pair 18 and 19, which may be taken to be the orientation of the flux valve itself.

These two voltages may be utilized in the manner shown in copending application Serial No. 366,370, for Flux valve magnetic compass, filed November 20, 1940, in the name of O. E. Esval et al., and now U. S. Patent No. 2,357,319, and especially Fig. 4 thereof, to provide an indication of the direction of the applied magnetic field or to suitably control a device, such as a mobile craft, in accordance with the direction of this field.

It is to be understood that the principle discussed above need not be restricted merely to two equally-spaced pairs of coils. By providing three pairs of coils equally spaced about the circumference of core 11, three output voltages will be derived, which may be utilized in the same manner as described in the above-mentioned copending application Serial No. 414,422, now U. S. Patent No. 2,383,461. Spacings other than equal may be used with special utilization apparatus.

The toroidal shape of the core in the above device offers a distinct advantage. Due to the core shape, leakage flux will be a minimum. If any leakage flux should appear, it will flow in concentric circles about the axis of the toroid and any effect therefrom will be a minimum, whereby unbalanced inductive pick-up from the primary or exciting flux is substantially eliminated.

Figure 2:
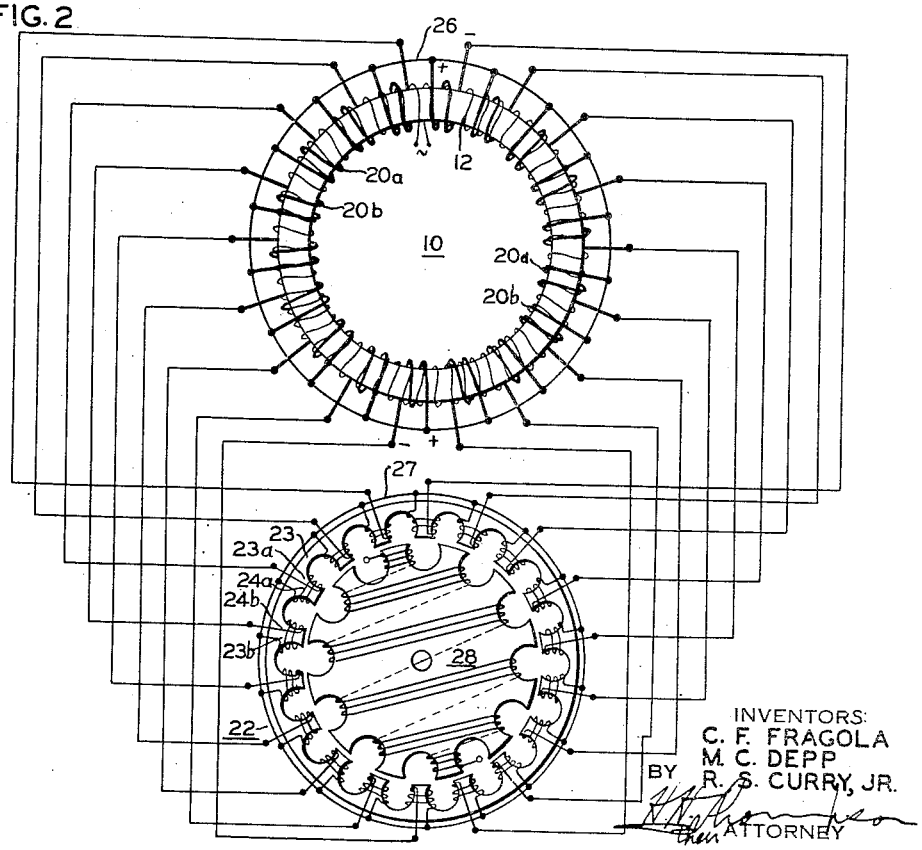
Fig. 2 is a schematic diagram of a similar form of flux valve operatively connected with a signal transformer or synchro transformer for producing an easily usable output therefrom.

Fig. 2 shows a more complete circuit of a device of the present type, in which the flux valve 10, formed in the manner described with respect to Fig. 1, carries, as an illustrative example, nine pairs of opposed secondary coils 20a, 20b, etc., and a single continuous toroidal exciting winding 12. These coils are then connected to a signal transformer or synchro transformer 22, generally of a self-synchronous or "Selsyn" type having a stator 23 carrying eighteen poles such as 23a, 23b, etc., each of which carries a corresponding coil 24a, 24b, etc.

Each of the secondary coils of flux valve 10 has one terminal connected to one terminal of a corresponding field winding of signal transformer 22. The other terminals of the secondary coils of flux valve 10 may be connected to a common conductor as shown, such as 26, and the remaining terminals of the field winding coils of stator 23 may also be connected to a common conductor, such as 27. If desired, conductors 26 and 27 may be connected together. In this manner a polyphase-type "star" connection is provided between the secondary coils of flux valve 10 and the corresponding field windings of signal transformer 22.

Each diametrically opposed pair of secondary windings of flux valve 10 is thus connected to a corresponding diametric pair of field windings of signal transformer 22, and in such sense that the oppositely situated field windings produce poles of opposite polarity in the airgap of the device. The rotor 28 of signal transformer 22 carries a distributed two-pole winding, and will thereby have induced therein a voltage of the same frequency as that produced by the flux valve output and having a magnitude corresponding to the relative angular displacement between the orientation of the flux valve 10 and the orientation of the rotor 28 and a phase-sense corresponding to the sense of this angular displacement.

The rotor of the signal transformer may be either of the round, distributed winding type or of the salient pole type hereinafter referred to. This voltage may then be utilized in the manner described in either of the above-mentioned copending applications Serial Nos. 414,422, or 366,370, which respectively correspond to U. S. Letters Patent Nos. 2,383,461 and 2,357,319, to provide an indication of, or a control action from, the direction of the external magnetic field.

Although the device of Fig. 2 has been disclosed as having nine pairs of coils 20a etc., it will be clear that any number of such pairs may be utilized while a corresponding number of pairs of field windings 24a, etc., and poles 23a, etc., may be utilized in the signal transformer 22. It is not necessary that the pairs of secondary windings of flux valve 10 be equally spaced so long as the corresponding elements or pairs of windings on the stator of signal transformer 22 are correspondingly spaced. The only requirement is that the resultant field produced by windings 24a, etc., shall lie in a direction relative to signal transformer 22 which corresponds to the relationship of the earth's magnetic field to flux valve 10, and shall vary in step with the earth's field as the flux valve 10 rotates relative to the earth's field.

In practice, the slot openings in the stator and rotor of the signal transformer 22 are made as narrow as is practical in order to produce a magnetic field wave having, as nearly as possible, a sinusoidal wave shape in the air gap.

It will be understood therefore that in the drawings the slots for the windings are so arranged only to provide clarity in the illustration.

Figure 3:
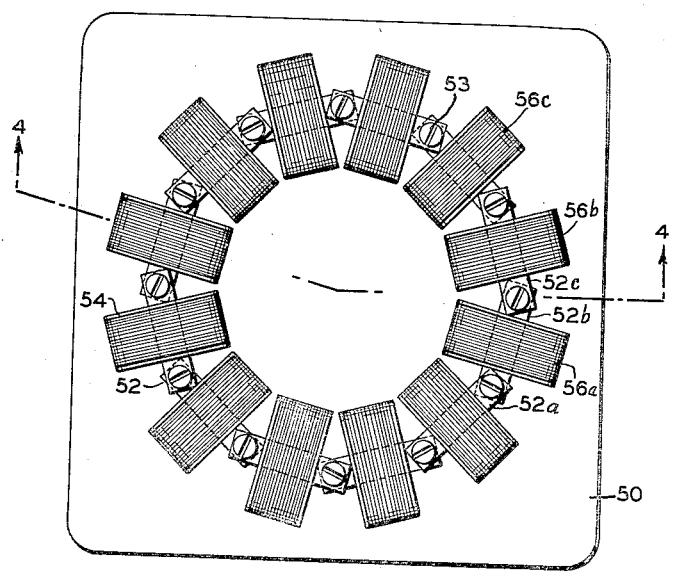
Fig. 3 is a plan view of a modification of the flux valve of the present invention.
Figure 4:
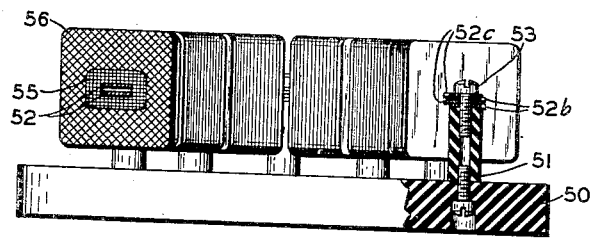
Fig. 4 is a cross-section of the device of Fig. 3 taken along lines 4—4 thereof.

Figs. 3 and 4 shown one form which the flux valve of Fig. 2 may assume. This apparatus has been designed to be easily and simply fabricated for purposes of mass production. The entire apparatus is built upon a base 50 to which there is fastened or on which there is formed a set of supporting posts such as 51, arranged along the arc of a circle, the posts 51 being equally spaced therearound. Both base 50 and posts 51 are made of non-magnetic material such as Bakelite. The flux valve of the invention is then supported upon these posts 51.

Instead of being formed toroidal as in Fig. 2, the flux valve core 52 of this modification is formed as a polygon, in this instance, having 12 sides approximating a toroid. It will be clear that any desired number of sides could be used.

For simplicity of fabrication, the polygonal core sides 52a, 52b, etc., are formed as separate straight strips. In the illustration used, two of these strips or laminations are utilized for each polygon side. The core laminations alternately lie above and below their adjacent laminations. Thus, the uppermost lamination 52a lies above the succeeding lamination 52b which, in turn, lies below its successor 52c, the latter then lying above the succeeding lamination, etc. The laminations at any one of the supporting posts 51 are arranged in alternation, as shown in Fig. 4, wherein laminations 52c alternate with the laminations 52b of the adjacent polygon side. The laminations may be fastened at their joints to the posts 51 by suitable means, such as screws 53. In this way, an easy and conveniently assembled fabricated core structure is provided. Supported on each of the polygon sides is a corresponding coil 54, made up in two independent sections, including an exciting coil 55 and a pick-up coil 56, both wound about the core members 52a, etc. The exciting windings 55 are energized in series from a suitable source of alternating current in the same manner as the toroidal exciting winding 12 of Fig. 2, to provide a continuously circulating flux in the polygonal core 52. The pick-up windings 56 are then connected to a signal transformer, for example, in the manner shown in Fig. 2 to provide a suitable output voltage.

Figure 5:
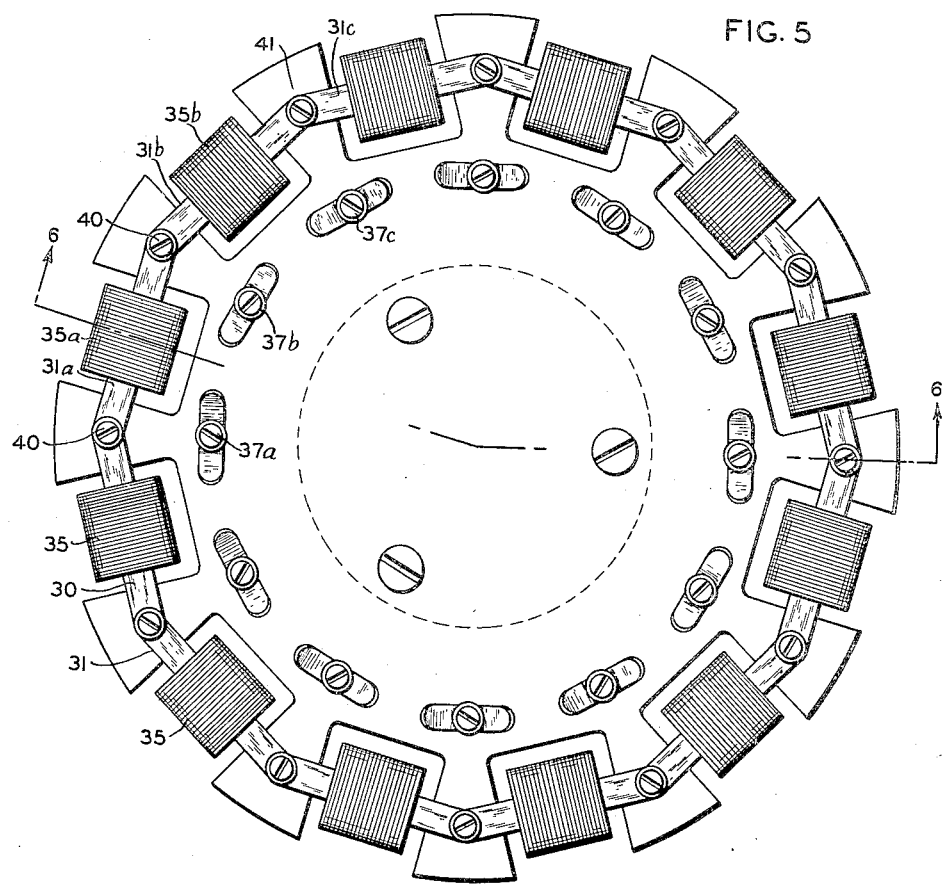
Fig. 5 shows a plan view of another modification of the invention.
Figure 6:
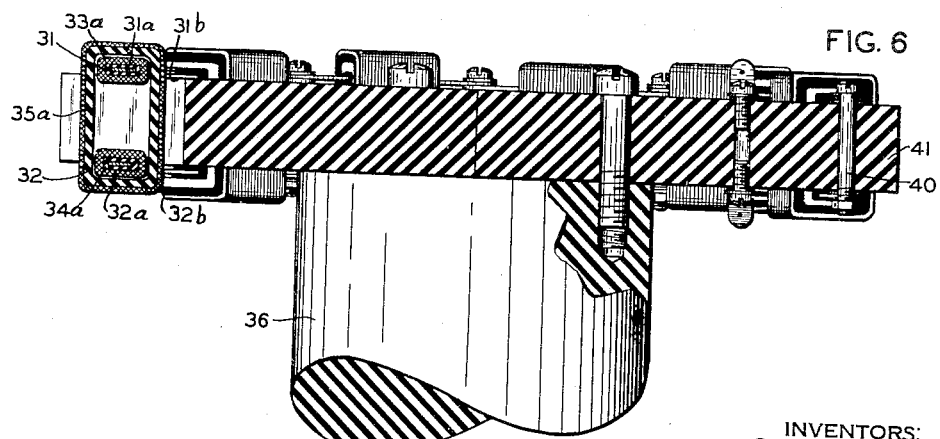
Fig. 6 shows a cross-sectional view of the device of Fig. 5 taken along lines 6—6 thereof.

Figs. 5 and 6 show another form which the flux valve 10 of Figs. 1 and 2 may assume. In this instance, the core 30 of the flux valve is formed of two parallel regular polygons 31 and 32, each formed by interconnected sections of flat magnetically permeable strips such as 31a, 31b, 31c, etc., comprising one of these polygons, and 32a, 32b, etc., forming the other of these polygons.

Corresponding strips 31 and 32 are fastened to a non-magnetic support by bolts 40, which may be magnetic or non-magnetic. The polygonal core pieces 31 and 32 are shown widely spaced for purposes of illustration but they may be arranged as close together as the exciting coil windings will permit.

Wound about each of these strips is a corresponding primary or exciting coil, such as coil 33a wound about strip 31a and coil 34a wound about strip 32a. The various coils 33a, etc., disposed about the polygon are connected in series and in such manner that the magnetic fields produced by current flowing therethrough, for any instantaneous value thereof, will be in the same sense proceeding around the polygon. Coils 34a, etc., are similarly connected. However, the instantaneous polarity sense for the upper polygon 31 is made opposite to that of the lower polygon 32. Wound about the core strips of each polygonal core such as core strips 31a, 32a, and their coils 33a, 34a is a secondary or pick-up coil 35a. A similar arrangement is provided between the pick-up coils 35 and exciting coils on each side of the polygonal core. It will be seen that in this manner closed magnetic paths are provided for each of the primary exciting fluxes as in the cases of Figs. 1 and 2.

In the absence of an externally applied magnetic field, such as the earth's field, zero voltage will be induced in each of the pick-up coils 35, since the effects of the two oppositely flowing or extending exciting magnetic fluxes will cancel one another. By providing primary exciting current of sufficient magnitude to cause the permeance of the core arms 31a, 31b, etc., and 32a, 32b, etc., to vary periodically, the two primary fluxes in said core arms will have different effects on the external or earth's magnetic field thereby producing a resultant output from each of the pick-up coils 35a, 35b, etc., depending upon the orientation of the axis of the coils 35, with respect to the direction of the magnetic field.

The output of each coil 35 is therefore similar to the combined output of the pair of coils such as coils 16 and 17 of Fig. 1 or 20a, etc., of Fig. 2. The core legs and pick-up coils of this embodiment, however, may be of an odd number. It will be noted that the coils 35 which are spaced 180 degrees apart will have opposite instantaneous polarity. Therefore, it will be clear that each such pair of coils 35 may be made to perform the same function as the coil pairs 16, 17 or 18, 19 of Fig. 1. These voltages may then be utilized in a manner similar to that shown in Fig. 2.

Alternatively, the output coils 35a, 35b, etc., may be grouped to provide a lesser number of outputs. Thus, in the illustration of Fig. 5, the twelve coils 35 may be grouped in sets of four adjacent coils, the coils of each set being connected in series, to provide three output voltages which may be used as in the prior applications cited above. Obviously, any other grouping may be used.

It will be seen that each of two parallel segments enclosed within a given output coil 35 of the polygons of Fig. 5 constitutes a complete flux valve in itself, so that Fig. 5, by one interpretation, may be considered to comprise a plurality of flux valves arranged in a closed polygon.

As shown in Fig. 6, the entire flux valve device may be made rotatable about the axis of a central shaft or column 40, if desired. The device of Fig. 1 or 3 may also be made rotatable. A plurality of terminal posts and connecting lugs, such as 37a, 37b, 37c, etc., may be provided for conveniently connecting the various primary and secondary windings as required. The entire flux valve device thus far described, as shown in Fig. 6, is mounted on the non-magnetic supporting member 41, as hereinbefore described, which may be conveniently cut out, as shown, to provide room for the various coils, the core strips being affixed to supporting member 41 by means of the bolts 40 extending through supporting member 41 and fastening the strips forming the polygons 31 and 32 thereto. These bolts are preferably of non-magnetic material, although they may be made of magnetic material without substantially affecting the operation of the device, since by virtue of the symmetrical arrangement of the primary exciting coils, the net flux passing through these connecting bolts will be zero.

Figure 7:
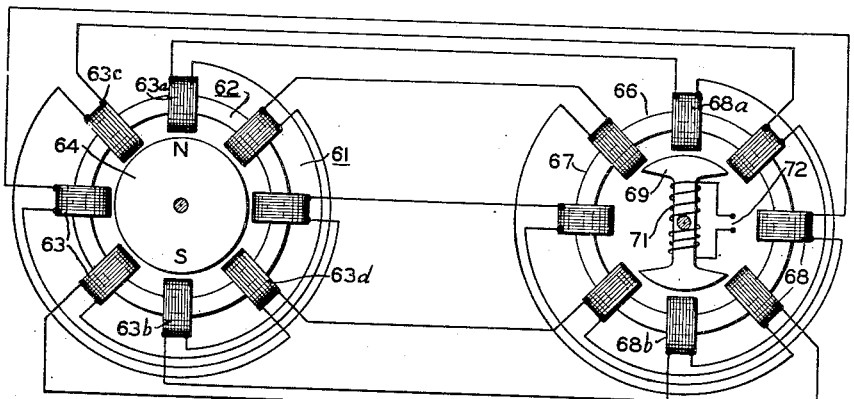
Fig. 7 is a schematic diagram of a remote compass or repeater system.

In Fig. 7, there is shown a system which may be used as a remote indicating compass or as a position repeating system. This system includes a flux valve transmitter 61 which may be constructed in the same manner as the flux valve hereinbefore described. In the embodiment herein illustrated, the valve comprises a closed toroidal core 62 in which is produced a circulating, periodically varying flux of sufficient amplitude to operate the magnetic material of core 62 in the desired region of varying permeability by means of suitable distributed or lumped exciting windings (not shown). Also wound about core 62 are a plurality of preferably symmetrically disposed and similar secondary or pick-up coils 63a, 63b, 63c and 63d, etc. Diametrically opposed pairs, such as coils 63a and 63b, are connected in series in such manner that zero resultant output voltage is produced by these pairs of coils in the absence of any external magnetic field.

When such a flux valve is subjected to an external magnetic field, an output voltage will be produced from each pair of coils having a frequency double that of the exciting flux and an amplitude proportional to the cosine of the angle between the direction of the axis of the coil pairs and the direction of the magnetic field. The external magnetic field may be provided either by the earth's magnetic field, in which case the device acts as a stationary-type compass, or by a magnet rotor 64 shown as comprising a circular magnet which provides the external field to which the flux valve transmitter 61 responds.

The receiver or repeater 66 is provided with a core 67 and secondary coils 68a, 68b, etc., similar to the construction of the transmitter 61. However, the stator of repeater 66 requires no exciting winding. The coils 68 of repeater 66 are grouped in corresponding diametrically opposed pairs, similar to the coils of transmitter 61, and each pair of coils 68 is connected to a corresponding pair of coils 63.

The coils 68 of each pair may be connected in series or in parallel, so long as the fluxes produced by the currents created therein by the voltage output of the coil pairs 63 are in the same direction in space, that is, tending to circulate oppositely in the core 67. Repeater 66 is provided with a rotor or armature 69 preferably in the form of a salient two-pole rotor of magnetic material.

The operation of the device may be understood from the following considerations. The coils 68a and 68b, for example, of repeater 66 produce equal and oppositely directed magneto-motive forces in the core 67. These magneto-motive forces will then produce a leakage flux flowing diametrically of the core 66 in a direction perpendicular to the diametral axis of the coils 68a and 68b. If, for example, the transmitter 61 is provided with only two coils 63a and 63b, and the repeater 66 with only one pair of corresponding coils 68a and 68b, it will be seen that, as the magnetic rotor 64 or as the direction of the earth's magnetic field varies with respect to transmitter 61, the magnetic field produced in repeater 66 will maintain fixed orientation, namely, in a direction perpendicular to the diameter joining coils 68a and 68b, but with a correspondingly varying intensity.

This action is characteristic of each pair of coils of repeater 66. Accordingly, by providing a large number of pairs of coils 68 in repeater 66, it will be seen that the pair of coils 68 corresponding to the pair of coils 63 whose diametric axis is perpendicular to the direction of the magnetic field to be sensed will have maximum current therein, and will produce a maximum diametral leakage flux in the manner described. The other pairs of coils 68 will produce decreasing amounts of this leakage flux depending on their angular relation to the particular pair of coils 68 producing this maximum flux.

Furthermore, the pairs of coils 68 symmetrically disposed with respect to the particular pair having maximum excitation will tend to produce respective leakage fluxes which, when added together, will produce a resultant flux along the same diameter as will the pair of coils having maximum excitation. Accordingly, for each position of the magnetic rotor 64 or for each orientation of the earth's magnetic field, a corresponding angular position of the magnetic axis of the leakage flux in repeater 66 will be produced. The magnetic armature or rotor 69 which, per se, may not be electrically excited will tend to align itself with this leakage flux axis and will provide a remote indication of the orientation of the magnetic field to which the transmitter 61 is exposed.

The armature, as above described, is subject to an ambiguity of 180 degrees since the leakage flux axis in repeater 66 will have the same position irrespective of the polarity of the magnetic field to which transmitter 61 is exposed. The magnetic leakage flux produced in repeater 66 is alternating at twice the frequency of the energy source employed in exciting the core of transmitter 61. To obtain sense indications of this magnetic field, armature 69 may be provided with a coil 71 which is excited from a suitable source 72 of reference voltage having a frequency twice that of the said exciting voltage used in exciting the core 62 of transmitter 61. We may employ an oxide rectifier arranged in a bridge circuit to derive a double frequency current from the source of fundamental frequency energy fed to the exciting coils of the transmitter.

It will be seen that armature 69 can maintain itself in equilibrium with the leakage flux in only a single position, and that a reversal of polarity of the external field to which transmitter 61 is exposed, by producing a reversal in phase of the output of coils 63 and hence a corresponding reversal in phase of the magnetic leakage flux in repeater 66, will produce a shift of 180 degrees in the equilibrium position of armature 69 so that armature 69 now gives a completely unambiguous indication of the orientation of the magnetic field to which transmitter 61 is exposed.

If the winding 71 is used, armature 69 is preferably made as a constant reluctance armature having a distributed two-pole winding to maintain constant characteristics in all positions. The coils of the system shown in Fig. 7 may be "star" or "mesh" connected.

It will be seen in each of the above modifications of the flux valve that a closed magnetic path is provided for the primary or exciting fluxes which therefore are practically entirely confined to the magnetic portions of the device. This presents a considerable advantage over prior constructions, where, as a practical matter, it was impossible to make all magnetic circuits exactly alike or to allow for the varying effects of leakage, due to the open parts of the magnetic circuit. For this reason, prior art devices were susceptible to distortion and errors in their outputs due to the inevitable unbalance of the primary fluxes with respect to the secondary winding, which the present devices have substantially completely overcome by means of the closed primary exciting flux paths.

From the foregoing, it will be observed that our present invention is characterized by the fact that, first, the reluctance of the flux path offered to the earth's direct current field is substantially constant as the flux valve is turned in azimuth; secondly, in a laminated structure, the use of a comparatively large number of laminations permits averaging out any variations of permeance; and thirdly, where twelve pick-up coils are used, for example, two consecutive coils may be series-connected providing six groups and oppositely disposed groups or those 180° removed may be connected in series opposition to provide what may be termed three phases. On the other hand, the coils may be arranged to provide a six phase output, for example, or any other desired multiple phase or multicircuit output.

In all cases, the series bucking connection of the coils, relatively arranged as herein described, substantially eliminates the fundamental of the supply frequency in the pick-up coils while the signal components in each pair are additive.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A flux valve comprising a pair of cores each arranged in the form of similar closed frames and disposed in substantially parallel relation, means for exciting said cores with oppositely circulating fluxes of sufficient amplitude to produce varying permeability in each of said cores, and a plurality of pick-up coils, each surrounding both of said cores, whereby the voltages produced in said pick-up coils will correspond to the direction of an external magnetic field with respect to the sides of said core.

2. A flux valve comprising a pair of cores arranged in the form of similar closed polygons and disposed in parallel relation, an exciting winding wound around each side of each of said cores, the windings of each of said cores being connected in series to produce a series circulating flux circulating in instantaneous opposite directions in the respective cores, each of said fluxes being of sufficient amplitude to operate its respective core in a region of varying permeability, and a plurality of pick-up coils, each wound around one pair of windings and parallel sides of said cores.

3. A flux valve device as in claim 2, further including a signal transforming device having a two-pole polyphase winding, the number of phases of said winding being related to the number of pick-up coils, and a single phase two-pole winding, said polyphase winding being connected to said pick-up coils to produce a magnetic field having a space orientation corresponding to the direction of an external magnetic field relative to said cores, whereby a voltage is induced in said single phase winding corresponding to the relative displacement of said single phase winding from the orientation of said produced field.

4. A flux valve system comprising a pair of flux valves arranged in superposed relation one above the other, an inductive device including windings connected in polyphase and a single phase winding, and means for energizing said windings from the outputs of said flux valves, whereby a voltage is induced in said single phase winding dependent upon the position of said single phase winding with respect to the resultant field produced by the windings in polyphase.

5. A flux valve comprising a pair of cores each arranged in the form of similar closed frames and disposed in substantially parallel relation, means for exciting said cores with oppositely circulating fluxes of sufficient amplitude to produce varying permeability in each of said cores, and a plurality of pick-up coils, each of said pick-up coils being associated with corresponding zones of each of said pair of frames.

6. A flux valve comprising a pair of cores each arranged in the form of similar closed frames and disposed in substantially parallel relation, means for exciting said cores with oppositely circulating fluxes of sufficient amplitude to produce varying permeability in each of said cores, and a plurality of pick-up coils each associated with both of said cores for providing signal voltage outputs dependent in magnitude on the direction of an external unidirectional magnetic field relative thereto.

7. A flux valve of the character recited in claim 5, in which the core frames are polygonal.

8. A flux valve of the character recited in claim 5, in which the core frames are annular.

9. A flux valve comprising a pair of cores arranged in the form of similar closed polygons and disposed in parallel relation, an exciting winding wound around each side of each of said cores, the windings of each of said cores being connected to produce a series circulating flux circulating in instantaneous opposite directions in the respective cores, each of said fluxes being of sufficient amplitude to operate its respective core in a region of varying permeability, and a plurality of pick-up coils, each of said pick-up coils being associated with corresponding sides of each of said pair of frames.

10. A flux valve comprising a pair of cores arranged in the form of similar closed polygons and disposed in parallel relation, an exciting winding wound around each side of each of said cores, the windings of each of said cores being connected to produce a series circulating flux circulating in instantaneous opposite directions in the respective cores, each of said fluxes being of sufficient amplitude to operate its respective core in a region of varying permeability, and a plurality of pick-up coils each associated with parallelly extending sides of both of said cores for providing signal voltage outputs dependent in magnitude on the direction of an external unidirectional magnetic field relative to said frame sides.

11. A flux valve device as in claim 6, further including an induction device comprising a polycircuit winding having coils arranged in relative relation corresponding to said pick-up coils, correspondingly positioned coils of said induction device and said pick-up coils being connected in polycircuit fashion, and said induction device including an armature operatively disposed in the field produced by the coils of said polycircuit winding.

12. A flux valve device as in claim 1, further including an induction device comprising a polycircuit winding connected in polycircuit fashion to said pick-up coils and an armature having a single phase winding operatively disposed in the field produced by said polycircuit winding.

13. In a flux valve system, a flux valve comprising a magnetically permeable core in the form of a closed frame, means for producing a pulsating flux in said core, a plurality of pick-up coils arranged on said core and distributed therearound, an induction device comprising a core of magnetic material having a form similar to that of said closed frame and a plurality of coils mounted thereon, said pick-up coils and said last-mentioned coils having like relatively distributed positions on the respective cores and those having corresponding positions being electrically connected together, and an armature comprising a single phase winding operatively disposed in the field produced by the coils of said device.

CAESAR F. FRAGOLA.
MARLIN C. DEPP.
ROBERT S. CURRY, Jr.